(12) United States Patent
Fay, II

(10) Patent No.: US 8,857,038 B2
(45) Date of Patent: Oct. 14, 2014

(54) DISC CUTTERBAR QUICK-CHANGE KNIFE WITH RETAINING PIN ASSEMBLY

(75) Inventor: Jeffrey Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 409 days.

(21) Appl. No.: 13/227,431

(22) Filed: Sep. 7, 2011

(65) Prior Publication Data

US 2013/0055546 A1  Mar. 7, 2013

(51) Int. Cl.
*B23P 11/00* (2006.01)
*A01D 34/52* (2006.01)
*A01D 34/73* (2006.01)

(52) U.S. Cl.
CPC .................. *A01D 34/733* (2013.01)
USPC ........................ 29/525.01; 56/295

(58) Field of Classification Search
CPC ............ B23P 6/00; B23P 19/06; B23P 19/02; B25B 17/08; B25B 27/30; A01D 34/63; A01D 34/64; A01D 34/664; A01D 34/733; A01D 34/4165; A01D 34/52
USPC .............. 29/525.01, 243.5, 525.02, 428, 891, 29/426.1, 402.03, 402.08, 464; 56/295, 56/255, 6, 12.7, 13.6; 30/276
See application file for complete search history.

(56) References Cited

U.S. PATENT DOCUMENTS

| | | | |
|---|---|---|---|
| 2,476,394 A | 7/1949 | Webb et al. | |
| 3,507,104 A | 4/1970 | Kline et al. | |
| 4,313,297 A | 2/1982 | Maier | |
| 5,996,323 A | 12/1999 | Campbell et al. | |
| 7,703,267 B2 | 4/2010 | Tapper | |
| 7,814,735 B2 | 10/2010 | Neudorf | |
| 8,510,959 B2 * | 8/2013 | Whitenight et al. | 30/276 |
| 2010/0101201 A1 | 4/2010 | Yanke | |
| 2010/0205925 A1 | 8/2010 | Thompson et al. | |

FOREIGN PATENT DOCUMENTS

EP  244041 A1  11/1987
EP  1008289 A1  6/2000

* cited by examiner

*Primary Examiner* — John C Hong
(74) *Attorney, Agent, or Firm* — Patrick M. Sheldrake; Seyed V. Sharifi T.

(57) ABSTRACT

A quick connect apparatus for connecting a knife to a rotary disc cutterhead comprising a spring-loaded connector and a locking device which, when installed, prevents unintentional release of the knife from the cutterhead. The quick connector with locking device replaces a conventional bolted connection and reduces the time necessary to remove and reinstall a knife on a rotary cutterhead compared to a bolted knife connector while improving knife retention compared to known quick-change knife connection mechanisms.

16 Claims, 4 Drawing Sheets

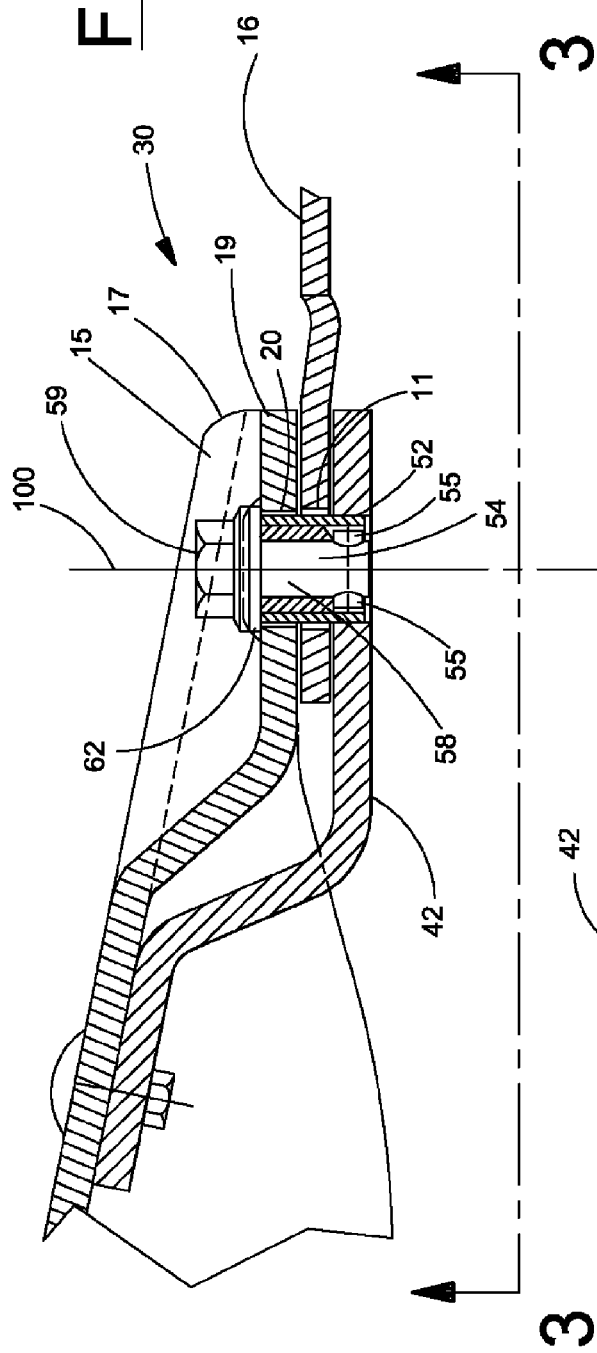

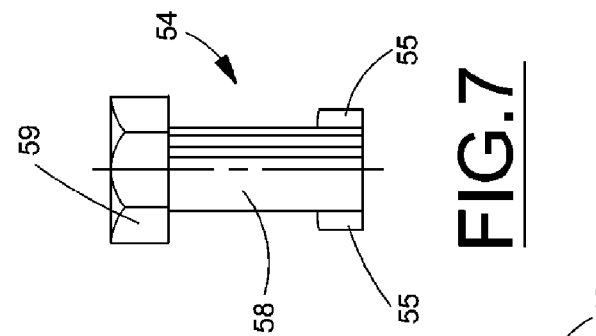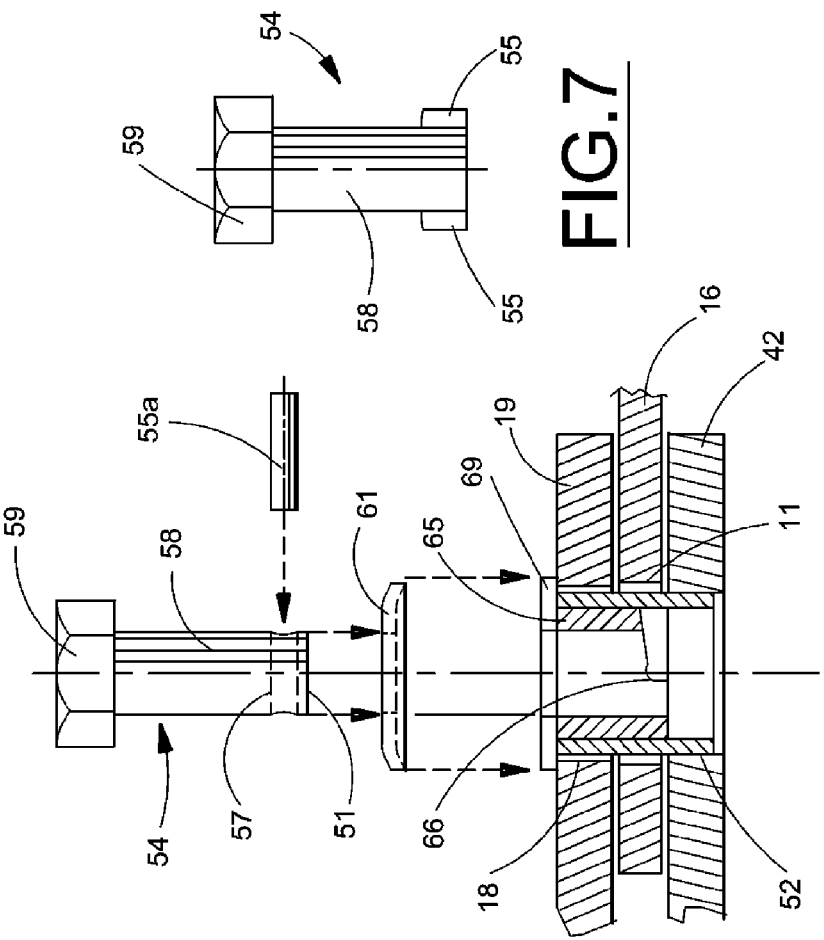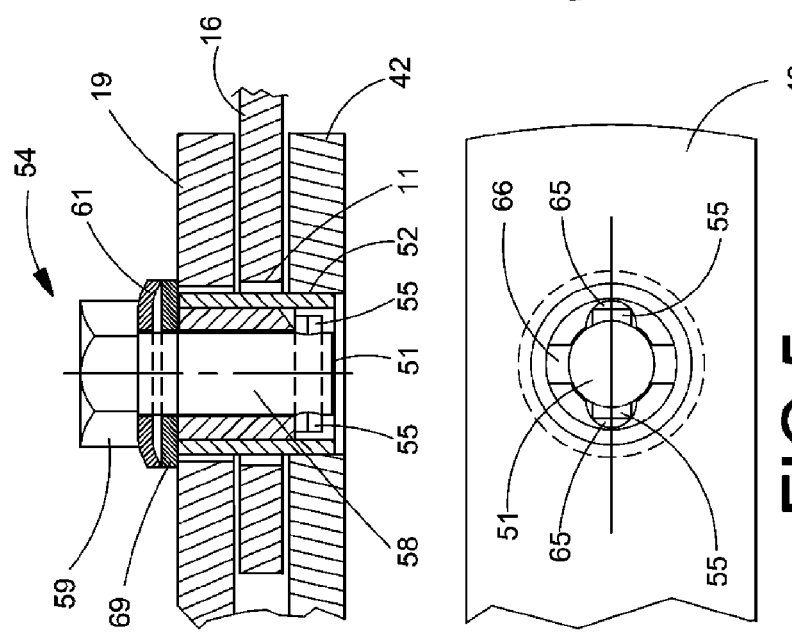

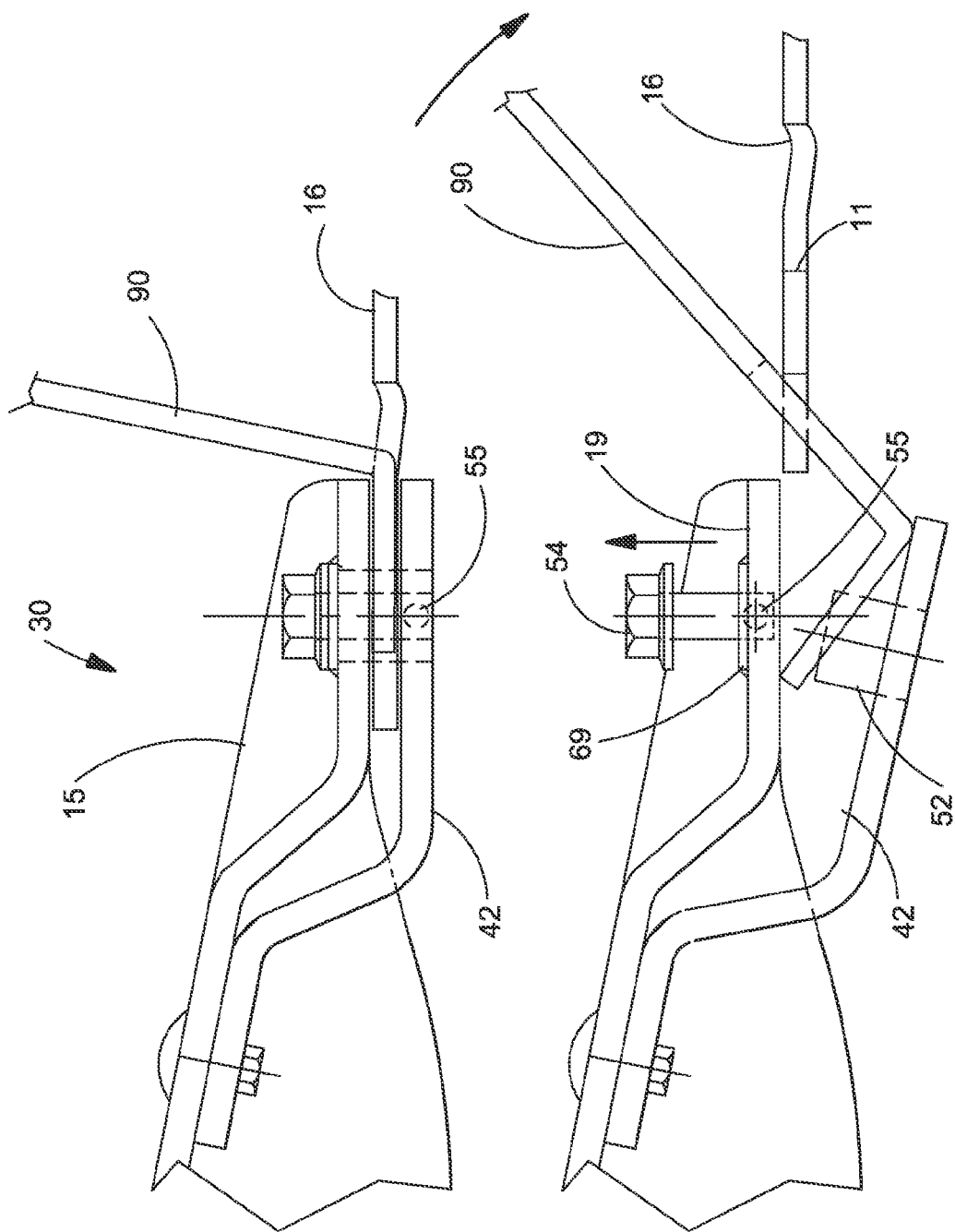

DISC CUTTERBAR QUICK-CHANGE KNIFE WITH RETAINING PIN ASSEMBLY

BACKGROUND OF THE INVENTION

This invention relates generally to machines for severing standing crops from the ground using a plurality of rotatable discs having knives mounted thereon to sever standing crop by an impact action upon rotation of the discs and, more particularly, to an improved mechanism for connecting disc cutter knives to a machine that allows the knives to be easily removed from the rotatable discs and replaced.

Rotary disc cutterbars are well known in the agricultural arts and used in the harvest of a variety of standing crops. A typical disc cutterbar comprises a plurality of cutterheads spaced along the length of the cutterbar. The cutterheads each typically comprise a rotating cutting disc including diametrically opposed cutting blades (though configurations with three or more blades are known) driven by a drivetrain housed within the cutterbar that receives motive power from the prime mover to which the disc mower is attached. For background information on the structure and operation of some typical disc cutterbars, reference is made to U.S. Pat. No. 5,996,323, issued to Campbell, the descriptive portions thereof being incorporated herein in full by reference.

Cutterbars frequently impact rocks and other obstructions in a field which can damage the knives. Further, knives also become dulled by their interaction with the crop and require periodic removal for sharpening or replacement. Knife retention is traditionally accomplished through the use of threaded fasteners which require multiple components and involve time-consuming processes to remove and replace damaged or worn knives. Quick-change knife attachment systems are known wherein the knife is retained by a pin that is held in position by a spring which reduce the part count for the knife connection mechanism. Operating history of spring-actuated quick-change knife attachment systems has shown that knives may be inadvertently released from the rotating cutting discs during operation, especially when the knives strike obstacles such as stones, limbs, or the ground. Significant risk of injury and damage may result from inadvertantly released knives as the cutterheads spin at up to 3,000 rpm.

It would be advantageous to provide a locking mechanism for a quick-change knife attachment system that would prevent inadvertent knife release while continuing to offer a convenient manner to quickly remove and replace a cutterhead knife. Additional advantages would be realized by a locking mechanism that adds no loose parts to the cutterhead to reduce the chance that sub components might be misplaced during knife changes or become projectiles if dislodged from the cutterhead.

SUMMARY OF THE INVENTION

Accordingly, the present invention, in any of the embodiments described herein, may provide one or more of the following advantages:

It is an object of the present invention to provide a knife connector for use on a rotary disc cutterhead allows the knife to be easily removed and reinstalled and includes a secondary locking mechanism to prevent inadvertent knife release.

It is a further object of the present invention to provide a quick-change knife connector for use on a rotary disc cutterhead which relies primarily on a spring element to retain the knife in position and include a locking pin to prevent unintentional release of the spring element.

It is a further object of the present invention to provide a quick-change knife connector for use on a rotary disc cutterhead having a locking pin that prevents release of the knife and in which the locking pin is non-separable from the cutterhead.

It is a still further object of the present invention to provide a locking pin for a quick-change knife connector on a rotary disc cutterhead that allows installation and removal of knives using existing tools for the task.

It is a still further object of the present invention to provide a retaining pin for a quick-change knife connection apparatus for a rotary disc cutterhead that is durable in construction, inexpensive of manufacture, carefree of maintenance, easily assembled, and simple and effective to use.

These and other objects are achieved in accordance with the instant invention by providing a quick connect apparatus for connecting a knife to a rotary disc cutterhead comprising a spring-loaded connector and a locking device which, when installed, prevents unintentional release of the knife from the cutterhead. The quick connector with locking device replaces a conventional bolted connection and reduces the time necessary to remove and reinstall a knife on a rotary cutterhead compared to a bolted knife connector while improving knife retention compared to known quick-change knife connection mechanisms.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial side view of a cutterhead from the header of FIG. 1 showing one embodiment of a knife connection mechanism embodying the present invention shown positioned as it would be during normal cutterhead operation;

FIG. 3 is an alternate view of the knife connection mechanism of FIG. 2 shown from below;

FIG. 4 is a detail view of the connection mechanism of FIG. 2 showing one embodiment of a retention pin for maintaining the mechanism and the knife engaged with one another;

FIG. 5 is a detail view of the connection mechanism of FIG. 2 showing a structure for engaging the retention pin to enable the knife to be selectively locked into engagement or released from the knife connection mechanism;

FIG. 6 is a detail view of a first embodiment of the retention pin used in the knife connection mechanism;

FIG. 7 is a detail view of a second embodiment of the retention pin used in the knife connection mechanism;

FIG. 8 is a side view of the knife connection mechanism showing a knife release tool positioned to commence knife removal; and FIG. 9 is a side view of the knife connection mechanism showing the knife release tool positioned to release the knife from the mechanism.

DESCRIPTION OF THE PREFERRED EMBODIMENT(S)

Figure 1:
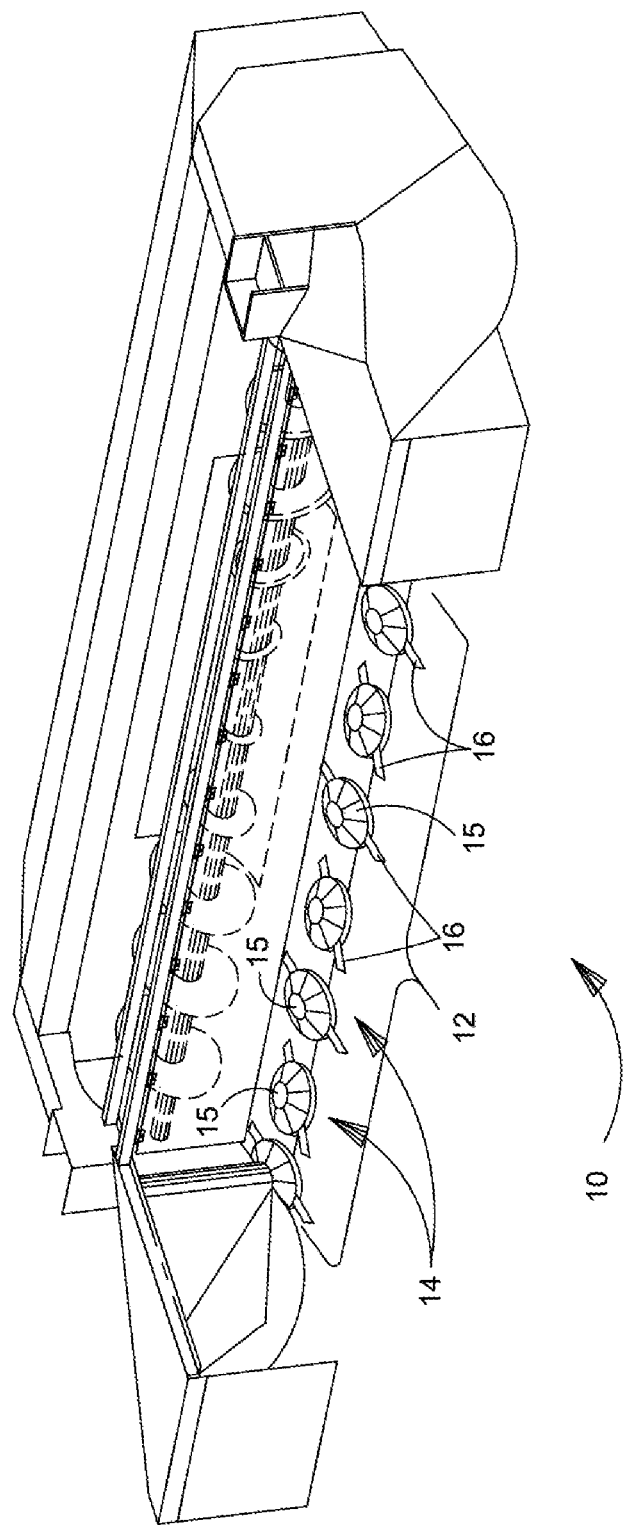
FIG. 1 is a forward perspective view of an agricultural harvesting header having a rotary disc cutterhead of the type on which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIG. 1, a crop harvesting header 10 having a rotary disc cutterbar 12 of the type on which the present invention finds utility is presented. Disc cutterbars have been utilized in agricultural harvesting implements for many years. A disc cutterbar comprises a plurality of transversely spaced rotary disc cutter modules 14 each being driven for rotation about a generally vertical axis. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference. Each disc cutter module 14 has two or three knives 16 mounted adjacent to the outer periphery of a rotating disc element 15 which are held in place by a knife connection mechanism.

Now referring to FIGS. 2 through 7 collectively, a first embodiment of the knife connection mechanism 30 comprises a knife mounting boss 19 formed on the rotating disc element adjacent to the peripheral edge 17 of the rotating disc element 15 and a spring plate 42. Mounting boss 19 and spring plate 42 are connected to the disc element 15 for rotation therewith and arranged to form a small gap between the mounting boss 19 and the spring plate 42. One knife connection mechanism 30 is provided for each knife 16 that is connected to the rotating disc element 15, typically two knives that are equally spaced apart around the disc element 15 periphery.

A pivot bushing 52 is connected to the spring plate 42 and extends therefrom toward the mounting boss 19. A mounting hole 11 provided in each knife 16 is configured to receive the pivot bushing 52 when the knife 16 is installed for cutterhead operation and position the knife 16 between the spring plate 42 and the mounting boss 19 along a knife pivot axis 100. The pivot bushing 52 at least partially extends into an aperture 20 in the mounting boss 19 when the spring plate is in its normal operating (unflexed) position (shown in FIGS. 2 and 3) so that the knife is restrained on the pivot bushing 52 between the spring plate 42 and the mounting boss 19. The pivot bushing 52 connection with the spring plate 42 and the aperture 20 in the mounting boss 19 transfers knife loads to the structure of the rotating disc element.

In order to prevent inadvertent disengagement of the knife 16 from the pivot bushing 52, a retainer pin 54 is provided. In a first embodiment, retainer pin 54 comprises a head 59, an elongate shank 58, and at least one catch structure 55 extending generally perpendicularly from the elongate axis of the retainer pin 54. The number and orientation of catch structures 55 is symmetrically configured about the elongate axis of the retainer pin 54. In the preferred embodiment, the catch structure is formed from a separate pin member 55a inserted through a cross-shank bore 57 in the shank 58 adjacent to the end 51 so that portions of the pin member 55a extend beyond the diameter of the shank 58. The pin member 55a is sized for a slight interference fit into cross-shank bore 57 so that it remains in position once installed into the cross-shank bore 57. Pin member 55a is preferably a roll pin.

The head 59 allows the retention pin 54 to be conveniently rotated and to provide a stop to prevent the pin from passing through the aperture 20 in a first direction. A washer 69 may also be used to provide a larger contact surface for the head 59 and/or to reduce the opening diameter of aperture 20 to a diameter closer to that of the shank 58. The washer 69 is preferably non-removably attached to the mounting boss 19, such as by welding or an equivalent mechanical connection. By sizing the opening 18 in the washer 69 to a diameter less than the protrusion of the pin member 55a and non-removably connecting the mounting washer 69 to the mounting boss 19, the retainer pin 54 cannot be separated from the connection mechanism 30 once the pin member 55a is installed thereby reducing the likelihood that the retaining pin 54 will be misplaced during knife changes.

A retainer engaging structure 60 is fitted within an end of the pivot bushing 52 connected to the spring plate 42. The retainer engaging structure 60 is configured with one or more release grooves 65 and one or more detents 66, the number of each matching the number of catch structures 55 present on the retainer pin 54. The release groove 65 allows the catch structure 55 to pass axially through the retainer bushing 54 and be fully disengaged from the bushing 54 while the detents 66 limit the degree of axial movement and prevent the catch structure from being removed axially from the bushing. In the preferred embodiment, the detents 66 and release grooves 65 are oriented such that rotation of the retainer pin 54 approximately one-quarter of a turn will shift the alignment of the catch structure between the detent and the release groove.

A spring washer 61 is provided between the head 59 and the mounting boss 19 (or washer 69) to allow limited axial movement of the retainer pin 54 and to bias the pin 54 so that the catch structures 55 remain in the detents 66 when the pin 54 is so oriented. When the catch structures 55 are engaged in the detents 66, the retainer pin 54 prevents the space between the spring plate 42 and the mounting boss 19 from being increased, thereby preventing the knife 16 from being disengaged. The retainer pin 54 thus provides an additional degree of protection from an accidental knife release, such as could occur if the spring plate was sufficiently deflected during a knife impact with an obstacle.

The catch structure 55 may be also be integrally formed from the shank 58 (e.g., machined from a single material billet) in lieu of a separate pin member 55a. Alteration of the spring washer 61 and the mounting washer 69 are required to allow each to be fitted on the shank 58 over the protruding catch structure 55.

A skilled artisan will note that the orientation of the knife connection mechanism 30 may be vertically inverted so that the retainer pin 54 is accessed from below. The disadvantage to an inverted orientation is the risk of damage to the head 59 of the retainer pin 54 as it will be positioned adjacent to the ground and subject to impact with obstacles on the ground. Similarly, the pivot bushing 52 may be permanently connected to the mounting boss and engaged by an aperture in the spring plate and continuing to orient the retainer pin 54 with the head 59 adjacent to the mounting boss 19. This configuration requires connecting the retainer engaging structure 60 to the spring plate while the remainder of the pivot bushing is connected to the mounting boss, complicating the design and increasing production cost.

Finally referring to FIGS. 8 and 9, the knife connection mechanism 30 is shown first in FIG. 8 with the retainer pin 54 positioned for release and a release tool 90 positioned as it would be at the beginning of the process to release a knife 16. The retainer pin 54 is positioned to align the retention tabs 55 with the release grooves 65 to permit the retainer pin 54 to move axially within the pivot bushing. The release tool 90 is this used to flex the spring plate 42 to increase the separation with the mounting boss to a position at which the free end of the pivot bushing 52 is sufficiently spaced apart from the mounting boss 19 to allow the knife 16 to be disengaged from the bushing 52 and removed from the connection mechanism 30. The retainer pin 54 may also be withdrawn to the extent practical (retainer tabs 55 in contact with the underside of mounting washer 69) to reduce the degree of flexure of the spring plate 42 required to release the knife 16. Installation of a knife is accomplished in the reverse manner, requiring that the spring plate 42 be deflected to open a space between the pivot bushing 52 and the mounting boss 19 through which the knife may pass. Once the knife mounting hole 11 is engaged on the pivot bushing 52, the spring plate 42 is allowed to return to its static position which engages the free end of the pivot bushing 52 with the aperture 20. Retainer pin 54 is then inserted into the pivot bushing 52 to the maximum extent and turned in a manner to reposition the retention tabs 55 into the detents 66. With the retainer pin 54 installed and engaged with the detents, the spring plate 42 is prevented from being flexed to disengage the pivot bushing 52 end from the aperture 20 thereby reducing the chance that a knife 16 may be inadvertently released from the connection mechanism 30.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for removably attaching a knife to a rotary disc used on a cutterbar on an agricultural machine comprising:

the disc configured for rotation about an operating axis and having a mounting boss disposed adjacent to an outer periphery, said mounting boss having a receptacle;

a spring plate connected to said disc, said spring plate having an elongate pivot bushing configured to connect said knife to said rotary disc connected at a first end to said spring plate, said pivot bushing extending generally toward said mounting boss and terminating in a second end, said spring plate further being moveable between flexed and unflexed positions, said unflexed position positioning engaging said second end in said receptacle in a manner to axially restrain the knife engaged on said pivot bushing between said mounting boss and said spring plate, said flexed position causing said second end to be disengaged from said receptacle whereby said knife may be disengaged from said pivot bushing;

an elongate retainer pin configured to selectively engage said mounting boss and said pivot bushing and positionable between restrained and released positions, said retainer pin when in said restrained position restraining said spring plate in said unflexed position, said retainer pin when in said release position allowing movement of said spring plate toward said flexed position thereby enabling disengagement of said knife from said pivot bushing.

2. The mechanism of claim 1, wherein said retainer bushing further comprises an axially aligned internal aperture configured to engage said retainer pin.

3. The mechanism of claim 2, wherein said retainer pin is moved between said released position and said restrained position by rotation of said retainer pin about its longitudinal axis.

4. The mechanism of claim 3, wherein said retainer pin further comprises at least one retention tab generally extending from said retainer pin, said internal aperture further configured to engage said at least one retention tab so that rotation to a first position restrains said retention pin in said pivot bushing and rotation to a second position allows release of said retention pin from said pivot bushing.

5. The mechanism of claim 4, wherein said retainer pin is non-separable from said mechanism.

6. A mechanism for removeably attaching a knife to a rotatable disc on a cutterhead used in an agricultural machine, the mechanism comprising:

the rotatable disc configured for rotation about an axis of rotation, said rotatable disc having a mounting boss disposed adjacent to an outer periphery, said mounting boss having a receptacle;

a spring plate connected to said rotatable disc, a portion thereof disposed adjacent to and spaced apart from said mounting boss, said spring plate being moveable between flexed and unflexed positions;

an elongate pivot bushing connected at a first end to said spring plate and configured to connect said knife to said rotatable disc, said pivot bushing extending generally toward said mounting boss and terminating in a second end, said unflexed position positioning engaging said second end in said receptacle in a manner to axially restrain the knife engaged on said pivot bushing between said mounting boss and said spring plate, said flexed position causing said second end to be disengaged from said receptacle whereby said knife may be disengaged from said pivot bushing; and an elongate retainer pin configured to selectively engage said mounting boss and said pivot bushing by insertion along a longitudinal axis, said retainer pin being positionable between restrained and released positions, said retainer pin when in said restrained position restraining said spring plate in said unflexed position, said retainer pin when in said release position allowing movement of said spring plate toward said flexed position thereby enabling disengagement of said knife from said pivot bushing.

7. The mechanism of claim 6, wherein said retainer bushing further comprises an axially aligned internal aperture configured to engage said retainer pin.

8. The mechanism of claim 7, wherein said retainer pin is moved between said released position and said restrained position by rotation of said retainer pin about said longitudinal axis.

9. The mechanism of claim 8, wherein said retainer pin further comprises at least one retention tab generally extending from said retainer pin, said internal aperture further configured to engage said at least one retention tab so that rotation to a first position restrains said retention pin in said pivot bushing and rotation to a second position allows release of said retention pin from said pivot bushing.

10. The mechanism of claim 9, wherein said retainer pin is non-separable from said mechanism.

11. A method of connecting or disconnecting a knife to a rotatable disc head on a cutterbar used on an agricultural machine comprising the steps:
providing the rotatable disc head configured for rotation about an axis of rotation;
providing a mounting boss disposed adjacent to an outer periphery of the disc head, the mounting boss having a receptacle;
providing a spring plate connected to the disc head, a portion thereof disposed adjacent to and spaced apart from the mounting boss, the spring plate being moveable between flexed and unflexed positions;
providing an elongate pivot bushing connected at a first end to the spring plate and configured to connect the knife to the rotatable disc head, the pivot bushing extending generally toward the mounting boss and terminating in a second end, the unflexed position positioning engaging the second end in the receptacle in a manner to axially restrain the knife engaged on the pivot bushing between the mounting boss and the spring plate, the flexed position causing the second end to be disengaged from the receptacle whereby the knife may be disengaged from the pivot bushing;
providing an elongate retainer pin configured to selectively engage the mounting boss and the pivot bushing by insertion along a longitudinal axis, the retainer pin being positionable between restrained and released positions;
positioning the retainer pin in the released position;
positioning the spring plate the flexed position;
engaging the knife on the pivot bushing;
re-positioning the spring plate to the unflexed position; and
engaging the retainer pin in the pivot bushing and re-positioning in the restrained position whereby the spring plate in restrained in the unflexed position thereby preventing disengagement of the knife from the pivot bushing.

12. The method of claim 11, further comprising the steps of:
positioning the retainer pin in the released position;
positioning the spring plate in the flexed position; and
disengaging the knife from the pivot bushing.

13. The method of claim 12, wherein the retainer bushing further comprises an axially aligned internal aperture configured to engage the retainer pin.

14. The method of claim 13, wherein the retainer pin is moved between the released position and the restrained position by rotation of the retainer pin about the longitudinal axis.

15. The method of claim 14, wherein the retainer pin further comprises at least one retention tab generally extending from the retainer pin, the internal aperture further configured to engage the at least one retention tab so that rotation to a first position restrains the retention pin in the pivot bushing and rotation to a second position allows release of the retention pin from the pivot bushing.

16. The method of claim 15, wherein the retainer pin is non-separable from said mechanism.

* * * * *